United States Patent

[11] 3,612,926

| | | | |
|---|---|---|---|
| [72] | Inventor | Walter Zizelmann |
| | | Alpirsbach, Germany |
| [21] | Appl. No. | 5,499 |
| [22] | Filed | Jan. 26, 1970 |
| [45] | Patented | Oct. 12, 1971 |
| [73] | Assignee | Licentia, Patent-Verwaltungs-G.m.b.H. |
| | | Frankfurt am Main, Germany |
| [32] | Priority | Jan. 31, 1969 |
| [33] | | Germany |
| [31] | | P 19 04 791.7 |

[54] PICKOFF DEVICE FOR ROTARY MACHINES
9 Claims, 1 Drawing Fig.

[52] U.S. Cl. .................................................. 310/46, 318/254
[51] Int. Cl. .................................................. H02k 37/00
[50] Field of Search ........................................... 310/46, 219, 156; 318/254, 138, 480; 317/235 (27); 250/217 SS

[56] References Cited
UNITED STATES PATENTS

| 3,257,594 | 6/1966 | Weigel | 318/138 |
| 3,436,540 | 4/1969 | Lamorlette | 317/235 (27) |

Primary Examiner—D. F. Duggan
Attorney—Spencer & Kaye

ABSTRACT: A pickoff device for a rotary machine in which radiation from a stationary radiation source is variably reflected by a reflector rotating with the rotor on to a stationary radiation sensor. A plurality of sensors may be provided and the radiation may be reflected successively on them. The outputs of the sensors may be used to control field windings where the machine is a direct current machine.

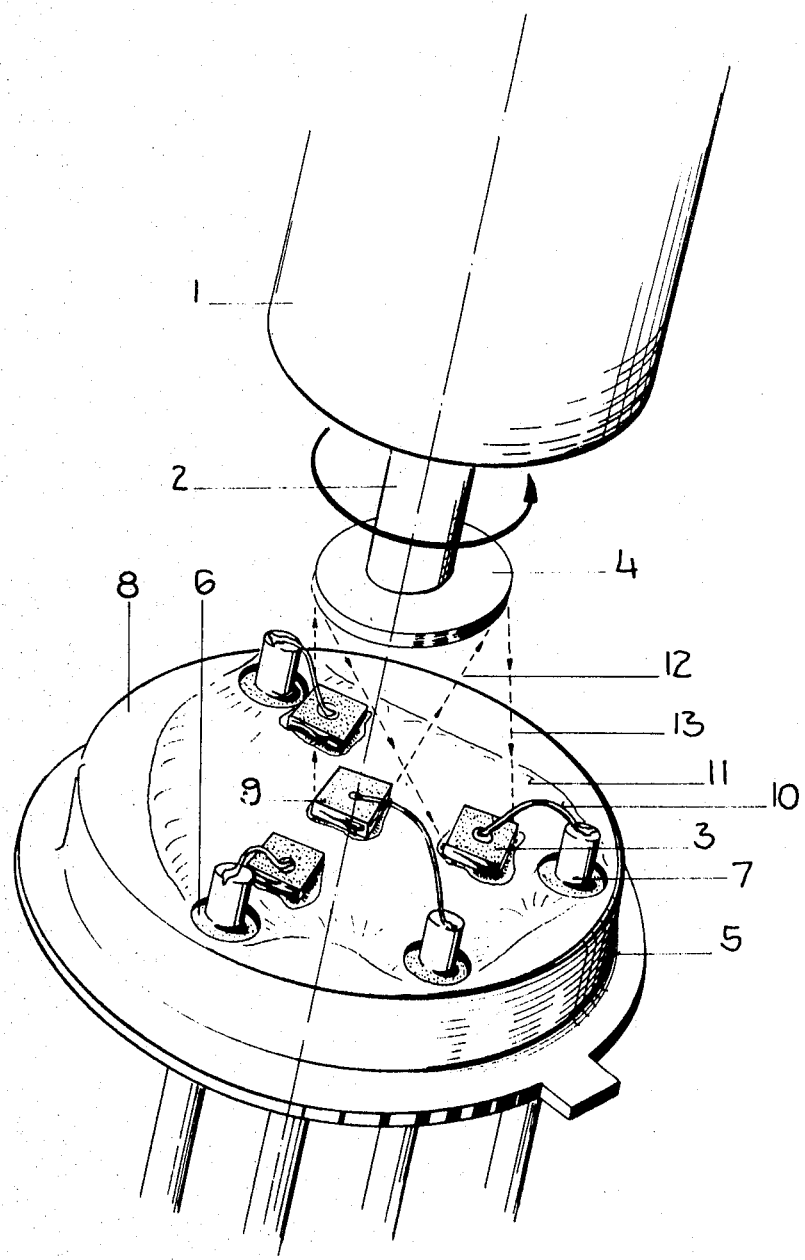
Inventor:
Walter Zizelmann

PICKOFF DEVICE FOR ROTARY MACHINES

BACKGROUND OF THE INVENTION

The invention relates to a pickoff device for rotary machines.

Pickoff devices are known which use a brush commutator like construction and may even be such a commutator if the rotary machine is a direct current machine.

Brushes rubbing against the armature of the machine are a particular disadvantage in known direct-current machines because these brushes have to be serviced and are exposed to unavoidable wear.

SUMMARY OF THE INVENTION

It is an object of the invention to avoid the difficulties inherent in the use of brushes.

According to the invention there is provided a pickoff device for a rotary machine comprising a stationary radiation source, a stationary radiation sensor and reflecting means rotatable with the rotor of said rotary machine and positioned for variably reflecting the radiation of said radiation source on to said radiation sensor in dependence on the rotation of said reflecting means.

Further according to the invention, there is provided a pickoff device for a direct-current machine, comprising a radiation-emitting semiconductor component, a plurality of radiation-sensitive semiconductor components, a reflector mounted on the armature shaft of said direct-current machine for reflecting radiation from said radiation emitting semiconductor component successively on to said radiation-sensitive semiconductor components during the rotation of the armature, and means for causing the functionally correct control of the field current of said direct current machine depending on the particular position of the armature in relation to the poles of the stator of said direct-current machine, from the outputs of said radiation-sensitive semiconductor components.

BRIEF DESCRIPTION OF THE DRAWINGS

The invention will now be described in greater detail, by way of example, with reference to the accompanying drawing, the single FIGURE of which is a perspective view of a pickoff device in accordance with the invention.

DESCRIPTION OF THE PREFERRED EMBODIMENT

In general, according to the invention a pickoff device for a direct-current machine comprises a reflector which is secured to the armature of the direct-current machine, a radiation-emitting semiconductor component and of a plurality of radiation-sensitive semiconductor components. The reflector is so constructed and so mounted on the armature shaft that the radiation emanating from the radiation-sensitive semiconductor component and deflected at the reflector sweeps successively over the radiation-sensitive semiconductor components during the rotation of the armature, and the current produced in the radiation-sensitive components serves for the functionally correct control of the field current depending on the particular position of the armature in relation to the poles of the stator. The new pickoff device construction is particularly suitable for small machines, the armature of which consists of at least one permanent magnet with a south pole and a north pole, the poles being offset by 180° in relation to one another at the circumference of the armature. In such direct-current machines, the field current of the exciting windings which surround the poles of the stator is controlled depending on the position of the armature in relation to the poles.

With the present invention, the control of the field current can be effected without contact by means of visible or invisible radiation which originates from a radiation-emitting semiconductor component and is deflected at a reflector secured to the armature shaft. This reflector rotates with the armature shaft so that the beam of light reflected therefrom successively sweeps over all the radiation-sensitive semiconductor components and briefly releases a photoelectric current therein according to the instantaneous position of the armature shaft during one revolution of the armature. This photoelectric current is preferably amplified in a suitable circuit and used to control the exciting current in the exciting winding of a stator pole associated with the particular photocomponent. The number or radiation-sensitive semiconductor components therefore preferably corresponds to the number of poles of the direct-current machine.

A gallium arsenide luminous diode is particularly suitable as a radiation-emitting semiconductor component while silicone photodiodes or phototransistors may be used as radiation-sensitive semiconductor components.

It has proved of particular advantage to accommodate the radiation-emitting and the radiation-sensitive semiconductor components in a common housing. In this case, the radiation-emitting semiconductor component may be secured in the middle to a cylindrical housing base while the radiation-sensitive semiconductor components are grouped concentrically with uniform spacing round this radiation-emitting semiconductor component. In this case, the radiation-sensitive semiconductor components are preferably at the same angular distance apart. As a protection against external influences, the radiation-emitting and the radiation sensitive semiconductor components are preferably embedded in a radiation-transmitting or translucent casting resin.

Referring now to drawing, there is shown a pickoff device for a three-pole direct-current machine in accordance with the invention. The poles of the direct-current machine—not illustrated in the FIGURE—which are secured to the stator and offset by 120° in relation to one another, are each surrounded by an exciting winding through which there flows the exciting current producing the rotating field. Projecting from the motor housing 1 is the end 2 of the armature shaft which, in the interior of the housing, carries a permanent magnet as an armature, the poles of which are offset by 180° for example in relation to one another at the circumference of the armature. The exciting windings of the stator poles must now be supplied with an exciting current, the strength and direction of which are so selected that the magnetic field developing between stator and armature acts as a rotating field. Amplifier circuits are suitable for this which are controlled at the input side by radiation-sensitive semiconductor components 3 which are in turn excited by a beam of light displaced with the armature shaft.

Secured to the end face of the armature shaft is a reflector 4 which may be constructed in the form of a shield for example and be concave at its face remote from the armature shaft. The reflector may also, however, consist of a flat mirror—as illustrated in the FIGURE—which is secured to the bevelled end face of the armature shaft. Mounted opposite the reflector is a housing 5 which consists essentially of a cylindrical housing base 6 of insulating material which is metallized in places at its surface adjacent to the reflector. Leads 7, which are insulated from one another and from the metallizing coatings 8 are taken through the house base. A gallium arsenide luminous diode 9 is soldered by one of its electrodes to the metallizing coating 8 in the middle of the surface of the housing adjacent to the reflector 4. This luminous diode is surrounded concentrically, with uniform spacing, by three silicon photodiodes 3 all of which are spaced apart at an angle of 120°. One electrode of each of the photodiodes is electrically connected to the metallizing coating 8 of the housing base. The second electrode of each photodiode 3 and the second electrode of the luminous diode 9 are each electrically connected, through a thin lead wire 10, to a lead wire taken through the housing base. The semiconductor components 3 and 9, the surface of the housing base and hence the thin lead wire 10 are embedded in a transparent synthetic-resin compound 11 and so protected from all external influences. A current, which leads to a beam of light 12 uninterrupted in time, is now supplied to the luminous diode 9. This beam of light 12 impinges on the reflector 4, which is starting up or already rotating, and is there reflected back, as a beam of light 13, on to the housing containing the semiconductor components. This beam of light is so deflected by the shape of the reflector surface that it sweeps successively during the rotation of the armature shaft or of the reflector, over the photodiodes 3, which are arranged in the form of a circle, and briefly and at different times produces therein a photoelectric current by means of which the current associated with each photodiode is controlled functionally correctly in the associated exciting winding.

The housing 5 containing the semiconductor components is preferably disposed in relation to the reflector 4 secured to the armature shaft so that axis of the armature shaft coincides with the axis of the cylindrical housing base. Luminous transistors may, of course, be used instead of luminous diodes and phototransistors instead of photodiodes. The number of photoelectric cells may also be varied as desired.

It will be understood that the above description of the present invention is susceptible to various modification, changes and adaptation.

What is claimed is:

1. A pickoff device for a brushless direct-current machine comprising:
    a stationary cylindrical housing having a base, said cylindrical housing being mounted adjacent the rotor of said machine and coaxial with the shaft thereof,
    a radiation-emitting semiconductor component disposed in the center of said base;
    a plurality of radiation-sensitive semiconductor components directly mounted on said base and concentrically surrounding said radiation-emitting semiconductor component, said radiation-sensitive semiconductor components all having the same angular spacing between adjacent ones thereof; and
    a reflecting means mounted on the end face of the shaft of said rotor for rotation therewith for reflecting the radiation emanating from said radiation-emitting semiconductor component consecutively onto said radiation-sensitive semiconductor components as said rotor rotates.

2. A pickoff device as defined in claim 1, wherein said rotor includes at least one permanent magnet having a south pole and a north pole; wherein the number of said radiation-sensitive semiconductor components corresponds to the number of poles in said direct-current machine; and wherein means responsive to the outputs of said radiation-sensitive semiconductor components are provided for causing the functionally correct control of the field current of said direct current machine depending on the particular position of said rotor relative to the poles of the stator of said direct-current machine.

3. A pickoff device as defined in claim 1 including means for causing the functionally correct control of the field current of said direct-current machine, depending on the particular position of the rotor in relation to the poles of the stator of said direct current machine, for the outputs of said radiation-sensitive semiconductor components.

4. A pickoff device as defined in claim 3, wherein the number of said radiation-sensitive semiconductor components corresponds to the number of poles in said direct-current machine.

5. A pickoff device as defined in claim 3, further comprising at least one permanent magnet having a south pole and a north pole carried by said rotor.

6. A pickoff device as defined in claim 1, wherein said radiation-emitting semiconductor component comprises a gallium arsenide luminous diode.

7. A pickoff device as defined in claim 6, wherein said radiation-sensitive semiconductor components comprise silicon photodiodes.

8. A pickoff device as defined in claim 6, wherein said radiation-sensitive semiconductor components comprise silicon phototransistors.

9. A pickoff device as defined in claim 1, further comprising a radiation-transmitting synthetic resin in which said radiation-emitting and said radiation-sensitive semiconductor components are embedded.